(12) United States Patent
Topham

(10) Patent No.: US 9,251,007 B1
(45) Date of Patent: Feb. 2, 2016

(54) DATA STORAGE ARRANGEMENT AND KEY DISTRIBUTION

(75) Inventor: Andrew Topham, Dursley Glos (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 2921 days.

(21) Appl. No.: 11/494,293

(22) Filed: Jul. 26, 2006

(30) Foreign Application Priority Data

Oct. 11, 2005 (GB) .................................. 0520600.8

(51) Int. Cl.
*H04L 9/08* (2006.01)
*G06F 11/30* (2006.01)
*G06F 12/14* (2006.01)
*G06F 11/14* (2006.01)

(52) U.S. Cl.
CPC ........ *G06F 11/1448* (2013.01); *G06F 11/1456* (2013.01)

(58) Field of Classification Search
CPC ............ G06F 11/1448; G06F 11/1456; G06F 11/1458; G06F 11/1469; G11B 23/02; G11B 23/285; H04N 5/782
See application file for complete search history.

(56) References Cited

U.S. PATENT DOCUMENTS

| | | | |
|---|---|---|---|
| 5,235,641 A | 8/1993 | Nozawa et al. | 713/193 |
| 5,319,705 A * | 6/1994 | Halter et al. | 705/54 |
| 5,351,159 A * | 9/1994 | Dodt et al. | 360/132 |
| 5,535,279 A | 7/1996 | Seestrom | |
| 5,651,064 A | 7/1997 | Newell | 705/51 |
| 5,757,908 A | 5/1998 | Cooper et al. | |
| 5,802,175 A * | 9/1998 | Kara | G06F 21/6209 380/277 |
| 5,905,798 A | 5/1999 | Nerlikar et al. | |
| 5,970,147 A | 10/1999 | Davis | |

(Continued)

FOREIGN PATENT DOCUMENTS

| | | |
|---|---|---|
| EP | 0913823 A2 | 5/1999 |
| EP | 1020856 A2 | 7/2000 |

(Continued)

OTHER PUBLICATIONS

Marisa, M., "Tape Inscription Devices: Host/based vs. Appliance New Tape Measure", *Storage and Server Technology*, Retrieved Nov. 28, 2005 <http://www.networkcomputing.com/shared/artic/printFullArticleSrc/jhtml?articleID=173602939>.

(Continued)

*Primary Examiner* — David Garcia Cervetti
*Assistant Examiner* — Trong Nguyen
(74) *Attorney, Agent, or Firm* — Ladas & Parry

(57) ABSTRACT

A data storage arrangement comprising a data transfer device and a removable data storage item, the removable data storage item storing an encryption key, and the data transfer device being operable to read the encryption key from the removable data storage item, encrypt data using the encryption key; and transfer the encrypted data to the removable data storage item. Additionally, a method of distributing a key for use in encrypting data to be stored on a removable data storage item, the method comprising: storing an encryption key to a removable data storage item, the removable data storage item having a unique identifier; storing an association of the unique identifier and a decryption key, the decryption key for use in decrypting data encrypted using the encryption key; receiving from a user a unique identifier of a removable data storage item; and returning to the user a decryption key associated with the received unique identifier.

16 Claims, 2 Drawing Sheets

(56) References Cited

U.S. PATENT DOCUMENTS

| | | | |
|---|---|---|---|
| 6,134,660 A | 10/2000 | Boneh et al. | 713/193 |
| 6,343,282 B1 | 1/2002 | Oshima et al. | |
| 6,357,005 B1 | 3/2002 | Devaux et al. | |
| 6,378,007 B1 | 4/2002 | Southwell | |
| 6,381,662 B1 | 4/2002 | Harari et al. | |
| 6,473,861 B1 | 10/2002 | Stokes | 713/193 |
| 6,672,695 B1* | 1/2004 | Napka et al. | 347/7 |
| 6,691,226 B1 | 2/2004 | Frank et al. | |
| 7,031,470 B1 | 4/2006 | Bar-On | |
| 7,089,424 B1* | 8/2006 | Subbiah | 713/189 |
| 7,181,624 B2 | 2/2007 | Asano et al. | |
| 7,200,546 B1 | 4/2007 | Nourmohamadian et al. | |
| 7,278,016 B1 | 10/2007 | Detrick et al. | |
| 2002/0122671 A1* | 9/2002 | Yoshimura | 399/12 |
| 2002/0157011 A1* | 10/2002 | Thomas, III | 713/193 |
| 2003/0074319 A1* | 4/2003 | Jaquette | 705/51 |
| 2003/0084304 A1* | 5/2003 | Hon | G06Q 20/367 713/185 |
| 2003/0204717 A1 | 10/2003 | Kuehnel | |
| 2004/0049464 A1* | 3/2004 | Ohmori et al. | 705/51 |
| 2004/0101140 A1 | 5/2004 | Abe | 380/277 |
| 2004/0107340 A1 | 6/2004 | Wann et al. | 713/153 |
| 2004/0190860 A1 | 9/2004 | Ishiguchi | 386/46 |
| 2004/0215955 A1 | 10/2004 | Tamai et al. | |
| 2005/0071591 A1 | 3/2005 | Goodman et al. | 711/163 |
| 2005/0152670 A1* | 7/2005 | Skaar | G11B 20/10 386/231 |
| 2005/0278257 A1 | 12/2005 | Barr et al. | 705/57 |
| 2006/0015946 A1 | 1/2006 | Yagawa | |
| 2006/0215305 A1* | 9/2006 | Yasue et al. | 360/71 |
| 2008/0040609 A1* | 2/2008 | Giobbi | 713/182 |

FOREIGN PATENT DOCUMENTS

| | | |
|---|---|---|
| EP | 1020856 A3 | 1/2001 |
| EP | 1185020 A1 | 3/2002 |
| EP | 1267245 A2 | 12/2002 |
| EP | 1333353 A2 | 8/2003 |
| EP | 1367764 A2 | 12/2003 |
| EP | 1440439 | 7/2004 |
| EP | 1585006 A2 | 10/2005 |
| EP | 1615368 A1 | 1/2006 |
| GB | 2264373 A | 8/1993 |
| GB | 2315575 A | 2/1998 |
| GB | 2330682 A | 4/1999 |
| GB | 2429308 | 2/2007 |
| WO | 02/05482 A1 | 1/2002 |
| WO | 03/034425 A1 | 4/2003 |

OTHER PUBLICATIONS

"CryptoStor Tape". *NeoScale systems*, Retrieved Nov. 29, 2005 <http://www.neoscale.com/English/Products/CryptoStor_Tape.html>.

"Cryptostore for Tape-Storage Security Appliance for Backup," Neoscale Systems, 2002.

"Cryptostore Tape 700 Family—Enterprise Class Tape Appliances," Neoscale Systems, 2002.

* cited by examiner

DATA STORAGE ARRANGEMENT AND KEY DISTRIBUTION

FIELD OF THE INVENTION

This invention relates to a data storage arrangement for storing encrypted data to a removable data storage item. Additionally, the invention relates to a method of distributing a key for use in encrypting data to be stored on a removable data storage item.

BACKGROUND OF THE INVENTION

Many institutions and corporations back up their data and use removable data storage items such as tape cartridges as the storage mechanism. Data are usually backed up in a secure location such as an off-site library from where data can be restored in the event of disaster recovery. There have been instances of company data potentially losing its confidentiality due to the loss of backup tape cartridges. In the event that the data on a lost tape cartridge has not been encrypted, that data would be relatively easy for a non-authorised user to read. That situation is undesirable.

Where the backed up data are extremely sensitive, a need is perceived to encrypt the data and thereby improve security. Encryption technology exists that can make the data on tape cartridges unreadable to any person without a correct decryption key. There may be a separate encryption/decryption key. It is difficult to manage the availability of encryption, decryption and encryption/decryption keys, especially in an environment with a multitude of tape cartridges.

The encryption of backup data on tape cartridges may be achieved in many ways and one method is for the backup device—the tape drive in this example—to perform the encryption and provide the encrypted data to the tape cartridge. This can work well but there remains the issue of managing the encryption key or keys used to encrypt the data on a tape cartridge. The encryption key or keys are stored in the tape drive or accessed by the tape drive and must match the key used to encrypt the data if the data is to be recovered. One method relies on the key or keys being provided by a host computer and sent to the tape drive via a SCSI command. The main issue with this is the management of the keys. Specific keys must be associated with specific pieces of data on specific tape cartridges. To restore the data the appropriate key must be found. In an environment with a lot of tape cartridges and potentially after a site disaster, this is not a trivial task.

Another solution is the use of backup software with encryption. This encrypts data as part of the process of reading the data from the disks or host computer and before passing the data to the tape drive. This has not been very popular because of the limited data throughput performance that may be obtained in comparison with hardware based encryption. Also, this method does not have an intrinsic key management system that guarantees the availability of the correct key for a specific cartridge.

A further solution involves an encryption appliance situated between the host computer and the tape drive. These often have similar throughput limitations to the software solution and still have key management issues.

All the existing solutions present difficulties in selecting the right key following a disaster.

SUMMARY OF THE INVENTION

This invention provides a data storage arrangement for storing encrypted data and a method of distributing a key for use in encrypting data and aims to facilitate simplification of the key management process.

One aspect of the invention provides a data storage arrangement comprising a data transfer device and a removable data storage item, the removable data storage item storing an encryption key, and the data transfer device being operable to read the encryption key from the removable data storage item, encrypt data using the encryption key; and store the encrypted data to the removable data storage item.

Preferably, the data transfer device is operable to delete the encryption key from the removable data storage item following data storage.

Advantageously, the data transfer device encrypts the data using asymmetric encryption such that a decryption key different from the encryption key is required to decrypt the data transferred to the removable data storage item.

Conveniently, the removable data storage item is provided in a tamper-evident packaging along with a decryption key, and the removable data storage item and the decryption key are accessible only by disturbing the tamper-evident packaging.

Preferably, the removable data storage item has a unique identifier, and the arrangement further comprises a records system that includes a database storing a list of unique identifiers and decryption keys associated with the unique identifiers, each respective decryption key for use in decrypting data stored on a removable data storage item having a respective unique identifier.

Advantageously, the records system is operable to receive a unique identifier and, in response, return a decryption key associated with the unique identifier.

Conveniently, the data transfer device is a tape drive and the removable data storage item is a tape cartridge.

A further aspect of the invention provides a removable data storage item for storing data, the removable data storage item storing an encryption key and being provided in a tamper-evident packaging along with a decryption key, wherein the encryption key is readable by a data transfer device for use in encrypting data to be stored to the removable data storage item, and the decryption key is for use in decrypting data stored on the removable data storage item, and the removable data storage item and decryption key are accessible only by disturbing the tamper-evident packaging.

Preferably, the removable data storage item has a data storage medium and a separate store for the encryption key.

Advantageously, the removable data storage item has a housing which identifies the data storage item as being specifically for encrypted data.

Conveniently, the decryption key is printed on paper and is obscured by the tamper-evident packaging.

Preferably, the decryption key is stored on a memory device to which access is prevented by the tamper-evident packaging.

Advantageously, the encryption key and decryption key are identical.

A still further aspect of the invention provides a data transfer device comprising means for reading an encryption key from a removable data storage item, means for encrypting data using the encryption key; and means for storing the encrypted data to the removable data storage item.

Preferably, the data transfer device further comprises means for deleting the encryption key from the removable data storage item following data storage.

Alternatively, the means for encrypting encrypts the data using asymmetric encryption such that a decryption key different from the encryption key is required to decrypt the data stored to the removable data storage item.

A further aspect of the invention provides a method of key distribution comprising: generating an encryption key and a corresponding decryption key; storing the encryption key to a removable data storage item, the removable data storage item having a unique identifier; storing an association of the decryption key and the unique identifier; and subsequently providing the decryption key to a user of the removable data storage item in the event that a copy of the unique identifier is provided by the user.

Preferably, the method further comprises generating the encryption key and the decryption key.

Advantageously, storing an association of a decryption key and the unique identifier includes maintaining a database containing records of removable data storage items, each record including a unique identifier of a respective removable data storage item and a decryption key associated therewith, and returning to the user a decryption key includes interrogating the database to identify a decryption key associated with the received unique identifier; and returning to the user the identified decryption key.

Conveniently, the method is performed by a manufacturer of the removable data storage item.

Alternatively, the method is performed by a trusted third party distinct from the manufacturer and the user of the removable data storage item.

Advantageously, the method is performed by a manufacturer of the removable data storage item and a trusted third party, and the trusted third party: generates the encryption key and the decryption key; provides the encryption key to the manufacturer; stores the association of the unique identifier and the decryption key; receives from the user the unique identifier of a removable data storage item; and returns to the user a decryption key associated with the received unique identifier, and the manufacturer stores the encryption key provided by the trusted third party to the removable data storage item.

Conveniently, the method further comprises: storing the decryption key to the removable data storage item, the removable data storage item being provided in a tamper-evident packaging and the decryption key being accessible only by disturbing the tamper-evident packaging; and storing an association of the unique identifier and the decryption key comprises disturbing the tamper-evident packaging to access the decryption key and recording the decryption key together with the unique identifier in a database; and returning to the user a decryption key comprises identifying from the database the decryption key associated with the received unique identifier, and returning to the user the identified decryption key.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
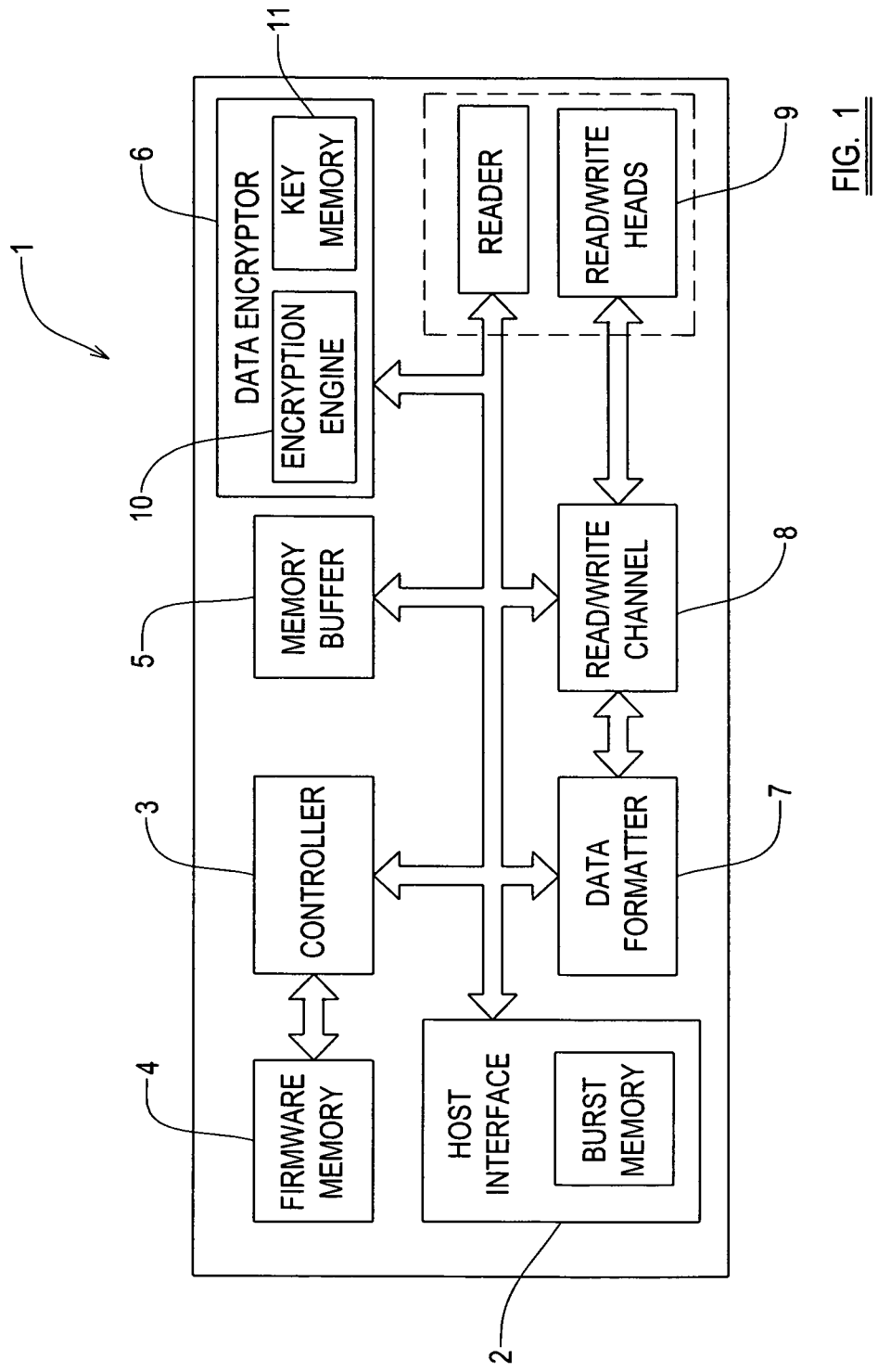
FIG. 1 is a schematic block diagram of a data transfer device.

Referring to FIG. 1, a data transfer device 1, in the present example a tape drive 1, comprises a host interface 2, a controller 3, firmware memory 4, a memory buffer 5, a data encryptor 6, a data formatter 7, a read/write channel 8, and magnetic read/write heads 9.

The controller 3 of the tape drive 1 comprises a microprocessor and executes instructions stored in the firmware memory 4 to control the operation of the tape drivel.

As previously mentioned, the drive 1 contains a data encryptor 6 comprising an encryption engine 10 and a drive key memory 11 which are incorporated into the chipset of the tape drive. The encryption engine 10 is operable to encrypt data incoming to the tape drive with the key stored in the drive key memory 11 before writing the then encrypted data to a tape cartridge via the read/write channel 8 and the read/write heads 9. Conversely, the encryption engine 10 is operable to decrypt data read from the tape cartridge with the key stored in the drive key memory 11 before passing decrypted data to a host computer by the host interface 2. The encryption engine 10 in each tape drive 1 relies on being supplied with the encryption key.

Figure 2:
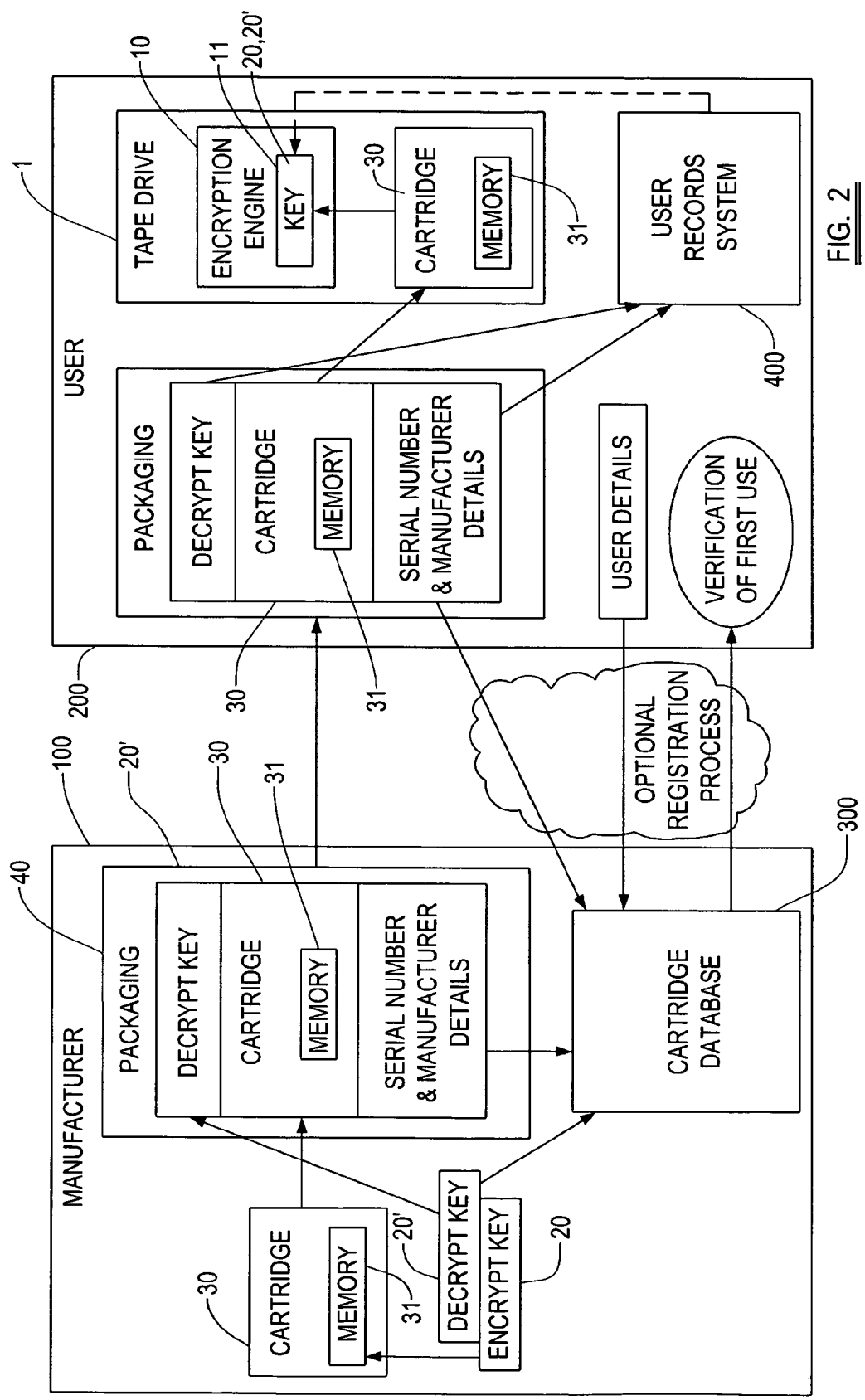
FIG. 2 is a schematic block diagram of removable data storage items and a key distribution embodying the present invention.

The method of key distribution is as follows and as illustrated in FIG. 2. Key management and distribution is controlled by associating a key 20 (or set of keys) with an individual tape cartridge 30. The cartridge 30 has a cartridge memory 31. The association between the key 20 and the cartridge 30 is created by the cartridge manufacturer 100 before the cartridge 30 is sold to the end user 200. The cartridges 30 created with this method are identified as being specifically for encrypted data, ideally with an obvious optical system such as a modification to the cartridge colour scheme that will at a glance tell the user that the cartridge 30 contains encrypted data. These encryption cartridges 30 ship with an encryption key 20 stored in the cartridge 30.

The encryption key 20 is stored in the cartridge memory 31 but it may be stored additionally or otherwise in a modification to the tape format or as data on the tape itself. The encryption key may be supplied with the cartridge 30 by being stored in an associated memory stick to be read from the memory stick or other memory device. The encryption key could also be associated with the cartridge as an RFID tag readable remotely by an RF reader.

The cartridges 30 are shipped in tamper-evident packaging 40. This ensures that it is obvious if anyone has attempted to read or modify the encryption key 20. A cartridge 30 should only be used if the packaging 40 has not been disturbed. The decryption key 20' is also made part of the cartridge package 40. It is necessary that this is not only within the tamper evident packaging, but is also properly obscured to prevent reading through the packaging 40. The decryption key 20' takes the form of data printed on a piece of paper, or it could be stored on a small flash memory device such as a USB memory stick or configured as an RFID tag.

Each cartridge 30 has a serial number and manufacturer details. This information is readily readable on the cartridge, preferably through a transparent portion of the packaging 40 or as a tamper-evident label on the packaging. This information is easily viewable and may be printed on the cartridge housing or otherwise provided inside the packaging 40.

The manufacturer 100 (or a trusted third party—hereinafter manufacturer) maintains a cartridge database 300 that relates each serial number with the key 20,20' stored on that cartridge 30. This provides a solution to the situation where a user has lost the key 20,20' to a cartridge 30. In such a case a user 200 may contact the manufacturer 100 to obtain the decryption key 20'. Clearly there would need to be extra security steps to this process to ensure that only the genuine user may obtain the decryption key 20'. The process recommended is one of the user 200 registering the cartridge 30 with the manufacturer 100 prior to use.

At first use, the user 200 would remove the cartridge packaging 40, use the manufacturer details on the cartridge body to contact the manufacturer online, via the web, enter the user's own details and enter the serial number of the cartridge 30. This information is provided to the cartridge database 300 maintained by the manufacturer 100. If the cartridge database indicates that the cartridge with that serial number is unused, then the user can have confidence that the cartridge ownership has now been registered and assigned to himself. This is a necessary precursor to potentially being able to access the decryption key 20' from the manufacturer's cartridge database 300 at a later date. However, the use of this registration process is optional and it may be that the user views their own key management techniques as adequate.

The user 200 maintains their own records system 400 which includes a database of cartridge serial numbers and their corresponding decryption keys 20'. The user records system 400 may be simply online access to the manufacturer's cartridge database 300 which also maintains a record of cartridge serial numbers and their respective decryption keys 20'.

Once the user 200 inserts an encryption cartridge embodying the invention into an encrypting tape drive, the tape drive identifies that this is an encryption cartridge through standard cartridge recognition processes at load time. The tape drive will then read the key 20,20' from the cartridge 30 in whatever form it is stored on the cartridge and store the encryption key 20 in the tape drive key memory 11 ready for encrypting by the encryption engine 10. All data subsequently written to that tape will be encrypted with this key 20. The key 20 is deleted from the tape drive key memory 11 when the cartridge 30 is unloaded or is overwritten by the key of the next loaded tape cartridge having a key.

The encryption/decryption keys are either symmetric keys or asymmetric keys. For symmetric keys, the encrypting and decrypting keys 20,20' are the same. The security of the system is enhanced if the key 20 is deleted from the cartridge memory 31 (or wherever else the key is stored on the cartridge 30) by the tape drive 1 once it has read the key from the cartridge and loaded the key 20 in the key memory 11. However, for asymmetric keys it is not necessary to delete the key from the cartridge memory 31 (or wherever else the key is stored on the cartridge 30) since it is not the decrypting key 20'. In that instance, the decrypting key 20' is provided separately in the cartridge packaging 40.

At decryption, i.e. when restoring data from a tape cartridge, the decryption key is required by the tape drive 1. The user records system 400 contains a record of the cartridge serial number and the respective decryption key 20' associated therewith. As shown by the dashed line in FIG. 2, the user records system 400 is interrogated by the user 200 by furnishing the cartridge serial number (read from the cartridge 30), whereupon the user records system 400 returns the decryption key 20' for storing in the key memory 11 of the tape drive for use in decrypting that cartridge 30.

The above embodiment is in relation to a single cartridge but for convenience and economic reasons the same concept can be implemented for a single package containing multiple cartridges. All the same principles apply. It is just necessary to ensure that the individual serial numbers are clearly listed with their respective decrypting key 20'.

The above embodiments discuss a single key 20 for a single cartridge 30. However, the concept is applicable to multiple keys 20 for a single cartridge 30 since encryption of large amounts of data with a single key does reduce the difficulty of disturbing the encryption. For greater security, therefore, multiple keys 20 may be associated with each cartridge 30.

The main advantage of this invention is the method of key management. The high visibility system makes the whole process very simple for the user who does not need to provide any additional infrastructure to implement key management. It is clear to the user which cartridges are encrypted through their cartridge colour scheme or other visible indicator. It is easy for the user 200 to find the appropriate key for any cartridge since they simply need to read the serial number from the cartridge and then consult their records for the matching decrypting key.

Another advantage of this system is the removal of the need to send the encrypting key to the tape drive. Traditionally this is sent as a clear SCSI command and so is vulnerable to interception. This is particularly true with the use of a storage area network. It also means that the existing data backup systems and processes do not need to be modified.

The decrypting key does need to be sent to the tape drive, and it is anticipated that this would use the traditional SCSI command. This may not be viewed as such a problem since a restore of data from a cartridge would typically only occur on an exceptional basis. If this were an issue it could be ensured that any restores were in a physically secured environment either at the user site or at the premises of a security service provider.

Another mechanism for providing the decryption key 20' would be for the tape drive 1 to have a memory stick reader to read the key from a memory stick or other memory device. The decryption key 20' could be configured on the cartridge as an RFID tag readable remotely by an RF reader provided on or in the tape drive 1.

Although embodiments of the present invention have been described with particular reference to tape cartridges and tape drives, it will be appreciated that the present invention is equally applicable to other types of removable data storage items and data transfer devices, not just tape based systems, such as optical drives, in which data are stored to removable data storage items such as CDs and DVDs.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A data backup system, comprising:
   a data transfer device configured to store encrypted backup data to a removable data storage item; and
   the removable data storage item that stores an encryption key created by a manufacturer of the removable data storage item,
   wherein the encryption key is stored on the removable data storage item before being shipped to an end user, and
   wherein the data transfer device receives the removable data storage item, reads the encryption key from the removable data storage item, encrypts data using the encryption key, and stores the encrypted data on the removable data storage item, wherein the removable data storage item includes a serial number, and wherein the manufacturer maintains a database that stores the serial number associated with the encryption key and provides the end user with the encryption key when the end user requests the encryption key and provides the manufacturer with the serial number.

2. The data backup system according to claim 1, wherein the data transfer device deletes the encryption key from the removable data storage item following data storage.

3. The data backup system according to claim 1, wherein the data transfer device encrypts the data to be stored on the removable data storage item without a need to receive the encryption key over a storage area network since the encryption key is stored on the removable data storage item that is placed in the data transfer device.

4. The data backup system according to claim 1, wherein the removable data storage item stores a unique identifier, and the data backup system further comprises a records system that includes a database storing a list of unique identifiers and decryption keys associated with the unique identifiers, each respective decryption key used to decrypt data stored on a removable data storage item having a respective unique identifier.

5. The data backup system according to claim 1, wherein the removable data storage item is provided in a tamper-evident packaging along with a decryption key, and the removable data storage item and the decryption key are accessed only by disturbing the tamper-evident packaging.

6. The data backup system according to claim 1, wherein the data transfer device is a tape drive and the removable data storage item is a tape cartridge.

7. A removable data storage item comprising a housing and memory for storing encrypted backup data, the removable data storage item being manufactured with an encryption key stored on the removable data storage item and being provided in a tamper-evident packaging along with a decryption key, wherein the encryption key is read by a data transfer device to encrypt data that is stored on the removable data storage item, and the decryption key decrypts data stored on the removable data storage item, and the removable data storage item and the decryption key are accessed only by disturbing the tamper-evident packaging, wherein the decryption key is stored on a memory device inside the tamper-evident packaging.

8. The removable data storage item according to claim 7, wherein the data transfer device retrieves the encryption key from the removable data storage item without a need to receive the encryption key over a network since the encryption key is stored on the removable data storage item that is received in the data transfer device.

9. The removable data storage item according to claim 7, wherein the housing comprises a color scheme that identifies the removable data storage item as being specifically for encrypted data.

10. The removable data storage item according to claim 7, wherein the decryption key is printed on paper and is obscured by the tamper-evident packaging.

11. A method of key distribution in a data backup system, comprising:
   manufacturing a removable data storage item with an encryption key, the removable data storage item being a tape cartridge;
   storing the encryption key in the removable data storage item before being shipped to a user, the removable data storage item including a unique identifier;
   storing an association of the unique identifier with a decryption key, the decryption key being used to decrypt data encrypted using the encryption key;
   receiving, by a manufacturer of the removable data storage item and from the user, a unique identifier of a removable data storage item; and
   returning from the manufacturer and to the user the decryption key associated with the received unique identifier.

12. The method according to claim 11, wherein storing an association of a decryption key and the unique identifier includes maintaining a database containing records of removable data storage items, each record including a unique identifier of a respective removable data storage item and a decryption key associated therewith, and returning to the user a decryption key includes interrogating the database to identify a decryption key associated with the received unique identifier, and returning to the user the identified decryption key.

13. The method according to claim 11, wherein the manufacturer that receives the unique identifier and returns the decryption key includes a trusted third party.

14. The method according to claim 11, further comprising shipping the removable data storage item in a tamper-evident packaging.

15. The method according to claim 11, wherein the method is performed by a manufacturer of the removable data storage item and a trusted third party, and the trusted third party:
   generates the encryption key and the decryption key;
   provides the encryption key to the manufacturer;
   stores the association of the unique identifier and the decryption key;
   receives from the user the unique identifier of a removable data storage item; and
   returns to the user a decryption key associated with the received unique identifier, and the manufacturer stores the encryption key provided by the trusted third party to the removable data storage item.

16. The method according to claim 11, wherein the method further comprises:
   storing the decryption key to the removable data storage item, the removable data storage item being provided in a tamper-evident packaging and the decryption key being accessed only by disturbing the tamper-evident packaging; and
   storing an association of the unique identifier and the decryption key comprises disturbing the tamper-evident packaging to access the decryption key and recording the decryption key together with the unique identifier in a database; and
   returning to the user a decryption key comprises identifying from the database the decryption key associated with the received unique identifier, and returning to the user the identified decryption key.

* * * * *